United States Patent Office 3,365,455
Patented Jan. 23, 1968

3,365,455
2,3,5,6 - TETRAHYDROXY - 1,4 - DIMETHANE - SULPHONYL PIPERAZINE AND DERIVATIVES AND PREPARATION THEREOF
Godfrey Fort, Ardrossan, Scotland, assignor to Imperial Chemical Industries Limited, London, England, a corporation of Great Britain
No Drawing. Filed Jan. 14, 1966, Ser. No. 520,663
Claims priority, application Great Britain, Feb. 5, 1965, 5,217/65
6 Claims. (Cl. 260—268)

ABSTRACT OF THE DISCLOSURE

The compounds 2,3,5,6-tetrahydroxy-1,4-dimethanesulphonylpiperazine; 1,2 - dimethanesulphonamidothane-1,2-diol and derivatives thereof. The compounds are prepared by reacting methanesulphonamide and glyoxal in the presense of an alkaline catalyst.

---

This invention relates to new compounds 2,3,5,6-tetrahydroxy-1,4-dimethanesulphonylpiperazine, 1,2 - dimethanesulphonamidoethane-1,2-diol and derivatives thereof, and to the preparation of these compounds. These compounds are addition products of methane sulphonamide and glyoxal.

In accordance with the invention a process for the preparation of 2,3,5,6 - tetrahydroxy - 1,4 - dimethanesulphonylpiperazine or 1,2 - dimethanesulphonamidoethane-1,2-diol comprises reacting methane sulphonamide and glyoxal in the presence of an alkaline catalyst. The reaction may be represented as:

(1)

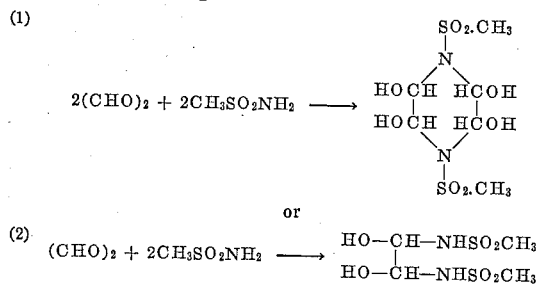

or (2)  (CHO)₂ + 2CH₃SO₂NH₂ ⟶ HO—CH—NHSO₂CH₃
                                    |
                                    HO—CH—NHSO₂CH₃

The reaction may conveniently be carried out in an aqueous reaction medium at room temperature and it is convenient to use the glyoxal in the form of its monohydrate. The employment of excess glyoxal favours Reaction 1 giving the piperazine derivative, and the presence of excess methane sulphonamide favours Reaction 2. Sodium carbonate and bicarbonate are suitable alkaline catalysts. The product crystallises from the reaction medium at room temperature and may be isolated by filtration.

2,3,5,6 - tetrahydoxy-1,4-dimethanesulphonylpiperazine is extremely reactive and is, therefore, a valuable intermediate for the preparation of organic compounds. For example, the hydroxyl groups are readily esterified to give, for example, chloro, nitrato or acetoxy derivatives. The tetranitrate ester, which is a valuable energetic constituent of explosive compositions, may be obtained by direct nitration of the tetrahydroxy compound of the invention or by nitration of the tetrachloro derivative of this compound.

The invention is further illustrated by the following examples in which all parts and percentages are by weight.

Example 1

19.0 parts of glyoxal monohydrate were dissolved in 37.5 parts of water at 35–40° C. The solution was cooled to room temperature and 23.75 parts of methane sulphonamide were added, followed by 1.25 parts of sodium bicarbonate. The resulting solution was allowed to stand at 20° C. and after 3 days the crystals which had formed were isolated by filtering. After washing with cold water and drying at 20° C. over phosphorus pentoxide in vacuo, 16.6 parts of a white crystalline powder were obtained. This yield was 43.5% of theory. The powder melted at 190° C. with decomposition and was found to contain C, 22.8%; H, 4.61%; N, 10.2%; S, 20.2%. 2,3,5,6-tetrahydroxy-1,4-dimethanesulphonylpiperazine

requires C, 23.5%; H, 4.57%; N, 9.16%; S, 20.9%.

The infra-red spectrum was determined on a dispersion of the product in a high-boiling petroleum fraction and showed strong absorption at 2.9, 7.55, 7.6, 7.7, 8.8, 9.5, 9.8, 11.3, 11.4 and 13.0µ and weaker absorption at 7.9, 10.15, 10.45 and 14.9µ.

Example 2

3.04 parts of glyoxal monohydrate were dissolved in 9.0 parts of warm water, and the solution brought to pH 8–9 by the addition of sodium bicarbonate. 11.4 parts of methane sulphonamide were added, followed by more sodium bicarbonate to bring the pH back to 8–9, and the solution left at room temperature. Crystalline material filtered off, after one hour and after one day, was identified by its infra-red spectrum and M.P. (191° C., decomposition) as 2,3,5,6-tetrahydroxy-1,4-dimethanesulphonylpiperazine. The yield (0.48 part) was 8% of theory. A further 1.50 parts of solid material were filtered off after two and nine days respectively at room temperature. This material had a melting point (with decomposition) of 199° C. and was found to contain C, 21.4%; H, 4.4%; N, 12.0%; S, 26.4%. 1,2-dimethanesulphonamidoethane-1,2-diol (C₄H₁₂N₂O₆S₂) requires C, 19.4%; H, 4.8; N, 11.3%; S, 25.8%.

Example 3

1.00 part of 2,3,5,6 - tetrahydroxy - 1,4 - dimethanesulphonylpiperazine, prepared as described in Example 1, was suspended in a mixture of 31.5 parts of glacial acetic acid and 32.5 parts of acetic anhydride. The suspension was cooled in ice and 1.38 parts of 96% sulphuric acid were added with stirring. After standing for 24 hours, the crystalline solid was filtered off, washed well with water and dried. The yield was 1.40 parts (90% of theory). After recrystallisation from hot acetonitrile the product melted with decomposition at 190–194° C. and was found to contain C, 37.0%; H, 4.3%; N, 5.8%; S, 13.8%. 2,3,5,6 - tetraacetoxy - 1,4 - dimethanesulphonylpiperazine (C₁₄H₂₂N₂O₁₂S₂) requires C, 35.45%; H, 4.6%; N, 5.9%; S, 13.5%.

The infra-red spectrum of the purified product dispersed in a high-boiling petroleum fraction was determined and showed strong absorption at 5.75, 7.5, 7.6, 8.3, 8.4–8.6, 9.8, 9.9, 10.1, 10.3–10.6, 10.9 and 13.1µ and weaker absorption at 7.15, 7.7, 7.8, 8.0, 8.95, 9.05 and 11.2µ. Absorption at 5.7–5.8µ indicated that the product was an acetate ester.

The proton magnetic resonance spectrum of the purified product in pyridine solution, using tetramethylsilane as internal reference, consisted of two peaks in the expected 2:1 intensity ratio at ξ-values of 7.89 and 6.55, which is consistent with the spectrum of the hydrogen nuclei of acetate and methanesulphonyl groups, respectively. The proton magnetic resonance spectrum of the product in acetonitrile solution had a peak at 3.64 ξ which is consistent with the spectrum of hydrogen nuclei on a piperazine ring.

Example 4

A mixture of 50 parts of thionyl chloride and 0.245 part of pyridine was added to 3.06 parts of 2,3,5,6-tetrahydroxy-1,4-dimethanesulphonylpiperazine prepared as described in Example 1 and the resulting suspension heated at reflux temperature in a water-bath for 2 hours. After cooling, the solid portion was filtered off, washed with acetonitrile and dried at room temperature under vacuum to give 3.3 parts of crude 2,3,5,6-tetrachloro-1,4-dimethanesulphonylpiperazine which darkened above 165° C. and melted to a dark tar at 190° C. (approximately). The pure product (1.81 parts) was obtained by recrystallisation from dimethyl sulphoxide and washing with chloroform and consisted of opaque crystals which did not melt on heating to 300° C. The crude product could also be recrystallised from hot nitromethane. The product recrystallised from dimethyl sulphoxide was found to contain C, 19.8%; H, 2.4%; Cl, 40.0%; N, 6.5%; S, 17.6%. 2,3,5,6-tetrachloro-1,4 - dimethanesulphonylpiperazine ($C_6H_{10}Cl_4N_2O_4S_2$) requires C, 18.9%; H, 2.63%; Cl, 37.4%; N, 7.37%; S, 16.8%.

The infra-red spectrum of the purified product showed strong absorption at 7.4, 7.7, 8.4, 8.6, 9.6, 10.9, 11.0, 13.15, 13.8 and 14.4$\mu$ and weaker absorption at 7.2, 7.6, 8.1, 10.0 and 10.35$\mu$. The bands at 13.8 and 14.4$\mu$ indicated the presence of C—Cl bonds.

The proton magnetic resonance spectrum of the purified product in dimethyl sulphoxide solution, using tetramethylsilane as internal reference, consisted of two peaks at $\xi$-value of 6.70 and 3.35, which was consistent with the spectrum of the hydrogen nuclei of methanesulphonyl group and piperazine ring, respectively.

Example 5

1.7 parts of silver nitrate dissolved in 15.7 parts acetonitrile were added dropwise at 20° C. to a stirred suspension of 0.95 part of recrystallised 2,3,5,6-tetrachloro-1,4-dimethanesulphonylpiperazine (prepared as in Example 4) in 7.8 parts of acetonitrile. The mixture was shaded from bright light and stirring continued at 35–40° C. for 15 minutes. Silver chloride was filtered off and washed with acetonitrile. The filtrate was evaporated under reduced pressure at 30° C. to give a solid product which still contained some silver chloride. The solid product was extracted once with 8 parts of cold acetone and then extracted twice at 40° C. using 8 parts of acetone for each extraction. The acetone extracts were combined and evaporated under reduced pressure at 30° C. to give 1.14 parts (94% of theory) of a colourless crystalline solid which was washed with cold water until free from traces of acid and, after drying at room temperature, was further purified by dissolving in acetone, filtering and reprecipitating by addition of a small amount of water. After drying at room temperature over phosphorus pentoxide in a vacuum desiccator, the purified product melted with decomposition at 140° C. and was found to contain C, 15.9%; H, 2.98%; N, 16.8%; S, 14.0%. 1,4-dimethanesulphonyl-2,3,5,6-tetranitratopiperazine ($C_6H_{10}N_6O_{16}S_2$) requires C, 14.8%; H, 2.06%; N, 17.3%; S, 13.2%. The infrared spectrum determined on a dispersion in a high-boiling petroleum fraction showed strong absorption at 6.0–6.1, 7.4, 7.55, 7.8, 8.0, 8.6, 9.1, 10.3, 10.8, 12.1–12.5 and 13.0$\mu$ and weaker absorption at 7.15, 7.9, 8.35, 9.7, 9.9, 13.5, 14.0 and 14.2$\mu$. The absence of absorption in the 2.7–2.9$\mu$ region showed that hydroxyl groups were absent and the strong absorption at 6.0–6.1$\mu$ was characteristic of nitric esters.

The proton magnetic resonance spectrum of the purified product in acetone solution, using tetramethylsilane as internal reference, consisted of two peaks at $\xi$-values of 6.46 and 2.73, which was consistent with the spectrum of hydrogen nuclei of the methanesulphonyl group and piperazine ring, respectively.

No ignition occurred when a ½ kg. mild steel hammer was dropped from a height of 5 cm. on to a thin layer of finely divided 1,4-dimethane-2,3,5,6-tetranitratopiperazine on a mild steel anvil, but ignition occurred when the height was 10 cm.

Example 6

15 parts of 99–100% nitric acid were added slowly with stirring to 3.25 parts of acetic anhydride at 0° C. 0.50 part of finely powdered 2,3,5,6-tetrahydroxy-1,4-dimethanesulphonylpiperazine (as prepared in Example 1) were added gradually with stirring, while maintaining the temperature at 0° C. After stirring for 30 minutes at 0° C. the reaction mixture which contained undessolved solid was poured on to ice and the solid filtered off, washed well with water and dried in vacuo over phosphorus pentoxide. 0.69 part of solid product were obtained. This product was found to contain C, 15.1%; H, 3.2%; N, 15.5%. S, 16.4% and had the same infra-red spectrum as the product from Example 5.

What I claim is:

1. A member of the group consisting of 2,3,5,6-tetrahydroxy-1,4-dimethanesulphonylpiperazine and the tetrachloro and tetranitrato derivatives thereof.

2. 1,4-dimethanesulphonyl - 2,3,5,6 - tetranitratopiperazine.

3. 2,3,5,6 - tetrachloro - 1,4-dimethanesulphonylpiperazine.

4. A process for the preparation of a member of the group consisting of 2,3,5,6-tetrahydroxy-1,4-dimethanesulphonylpiperazine and 1,2-dimethanesulphonamidoethane-1,2-diol which comprises reacting methane sulphonamide and glyoxal under alkaline reaction conditions.

5. A process as claimed in claim 4 wherein an alkaline catalyst is employed, said catalyst being selected from the group consisting of sodium carbonate and sodium bicarbonate.

6. A process as claimed in claim 4 wherein the reaction is carried out in an aqueous reaction medium.

References Cited

Noller: Chemistry of Organic Compounds (1965), pages 146–47.

HENRY R. JILES, *Primary Examiner.*